R. KECK.
Manufacture of Mirrors.
No. 50,874.
Patented Nov. 7, 1865.
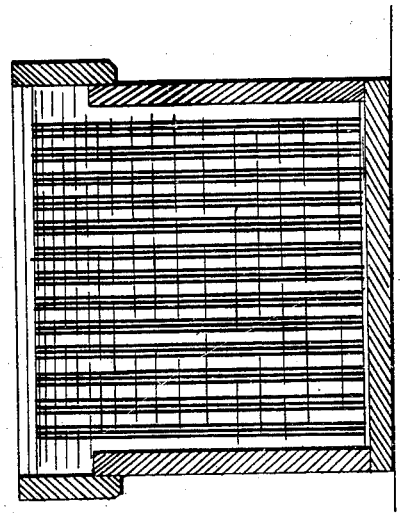
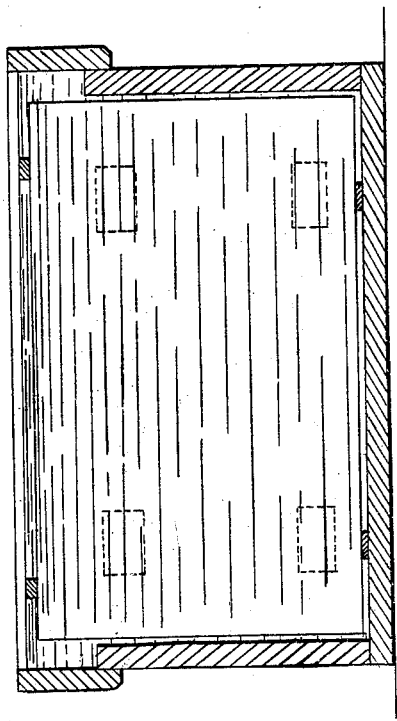

UNITED STATES PATENT OFFICE.

RUDOLPH KECK, OF NEW YORK, N. Y., ASSIGNOR TO SIMON BACHE & CO., OF SAME PLACE.

IMPROVEMENT IN THE MANUFACTURE OF MIRRORS.

Specification forming part of Letters Patent No. 50,874, dated November 7, 1865.

*To all whom it may concern:*

Be it known that I, RUDOLPH KECK, of the city, county, and State of New York, have invented a new and useful Improvement in the Manufacture of Mirrors, &c.; and I do hereby declare that the following is a full, clear, and exact description thereof, which will enable those skilled in the art to make and use the same, reference being had to the accompanying drawings, forming part of this specification, in which—

Figure 1 represents a longitudinal vertical section of this invention. Fig. 2 is a transverse vertical section of the same.

Similar letters of reference indicate corresponding parts.

This invention relates to a new method of precipitating upon the inner surface of a plate for a looking-glass nitrate of silver or other suitable substance from a solution by placing the glass edgewise into a vat, the face of each glass being protected by placing it against the face of the adjoining plate with an intervening sheet of india-rubber, gutta-percha, or other bad conductor of electricity, whereas the back of the plates are free, so that when the vat is filled with the solution of silver or other materials the metallic salt contained in said solution is evenly and uniformly precipitated on the backs of all the glass plates, and a large number of mirrors of great brilliancy can be made in a short time and with comparatively little expense. On taking the plates out of the bath a coat of varnish is applied over the layer of metal as a protection, and thereby mirrors made according to this plan are rendered cheaper and much more durable than mirrors coated with mercury in the ordinary manner.

A represents a vat of sufficient size and depth to receive a number of glass plates, which are arranged in the same as shown in Fig. 2. They are placed in pairs, the faces of the adjoining plates being turned toward each other with an intervening sheet of india-rubber, gutta-percha, or other suitable material, and they are held in an upright position by two or more cross-bars, *a*, fastened across their edges or in any other suitable manner, which allow free access to the backs of the plates. After the plates have been thus arranged in the vats the solution of nitrate of silver or other suitable metallic salt is poured in, care being taken to avoid the adhesion of air-bubbles to the glass plates, and the vat is filled so that the plates are completly immersed. No heat is required if the solution is properly made, and in less than an hour the plates are covered and ready to be removed from the bath. After the plates have been removed the layer of metal on their backs is protected by a suitable varnish, and the mirror is ready for the market.

By this method of silvering mirrors the use of mercury is entirely avoided; the quantity of mirrors produced in a given time is much greater than by the old method; the plates are not liable to get broken, since it is not necessay to load them with heavy weights; uneven or curved plates can be silvered as well as flat surfaces; the mirrors produced according to this method have a greater power of reflecting light than ordinary mirrors; and, finally, defects in the mirrors are discovered, immediately upon removing the same from the bath, and can be remedied before the mirrors are given out, whereas in mirrors coated with mercury certain defects appear long after the same have been sold, to the great annoyance of the buyer and of the manufacturer.

I claim as new and desire to secure by Letters Patent—

The within-described method of precipitating upon glass plates nitrate of silver or other suitable substance or substances, by means substantially such as herein described or any other equivalent means.

RUDOLPH KECK.

Witnesses:
M. M. LIVINGSTON,
W. HAUFF.